(No Model.) 2 Sheets—Sheet 1.
R. GOOD & R. GOOD, Jr.
MACHINE FOR MAKING GLASS VESSELS.

No. 585,469. Patented June 29, 1897.

(No Model.)  2 Sheets—Sheet 2.

R. GOOD & R. GOOD, Jr.
MACHINE FOR MAKING GLASS VESSELS.

No. 585,469. Patented June 29, 1897.

Witnesses:  Inventors:
Robert Good
Robert Good Jr.

UNITED STATES PATENT OFFICE.

ROBERT GOOD, OF POUGHKEEPSIE, NEW YORK, AND ROBERT GOOD, JR., OF DENVER, COLORADO.

MACHINE FOR MAKING GLASS VESSELS.

SPECIFICATION forming part of Letters Patent No. 585,469, dated June 29, 1897.

Application filed October 24, 1896. Serial No. 609,948. (No model.)

*To all whom it may concern:*

Be it known that we, ROBERT GOOD, residing at Poughkeepsie, in the county of Dutchess and State of New York, and ROBERT GOOD, Jr., residing at Denver, in the county of Arapahoe and State of Colorado, citizens of the United States, have invented certain new and useful Improvements in Machinery for Making Glass Vessels; and we do hereby declare the following to be a full, clear, and exact description of the invention, such as will enable others skilled in the art to which it appertains to make and use the same.

Our invention relates to improvements in glass machinery for manufacturing glass vessels such as have a mouth whose diameter is smaller than that of the inside of the bottle or other vessel.

The improved machine which we have invented is designed to produce glass vessels by first pressing by ordinary methods a quantity of hot glass into the shape of a vessel whose upper extremity corresponds in all respects to the head of a bottle or jar to be produced, but whose inside diameter is the same or smaller than that of its mouth its entire length, then partially withdrawing a plunger and removing the parison-mold below the neck, leaving the incomplete vessel, which is yet in a viscous condition, suspended by the neck part of the mold and at the same time closing the finishing-mold around the glass vessel, and finally blowing the glass vessel to the exact shape of the finishing-mold by introducing through the plunger a current of air, steam, or liquid under pressure.

Our improvements relate more especially to the mechanism by which the parison and finishing molds are operated to bring them into proper relation to the mass of viscous glass and to the combination and organization of elements acting in conjunction with these devices in a manner and for the purposes which will be hereinafter more fully described and claimed.

To enable others to understand our invention, we have illustrated the preferred embodiment thereof in the accompanying drawings, forming a part of this specification, and in which—

Figure 1:
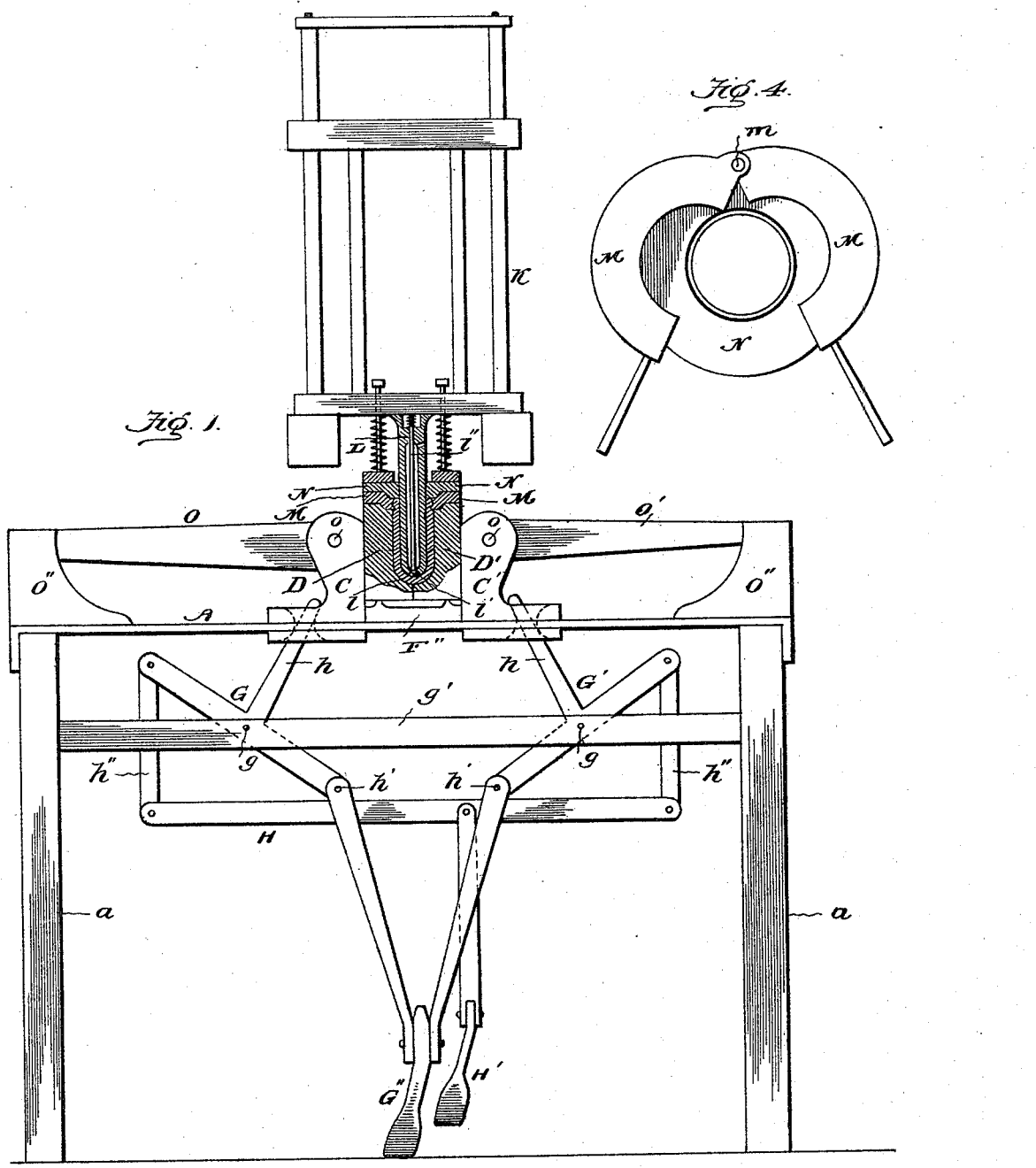
Figure 2:
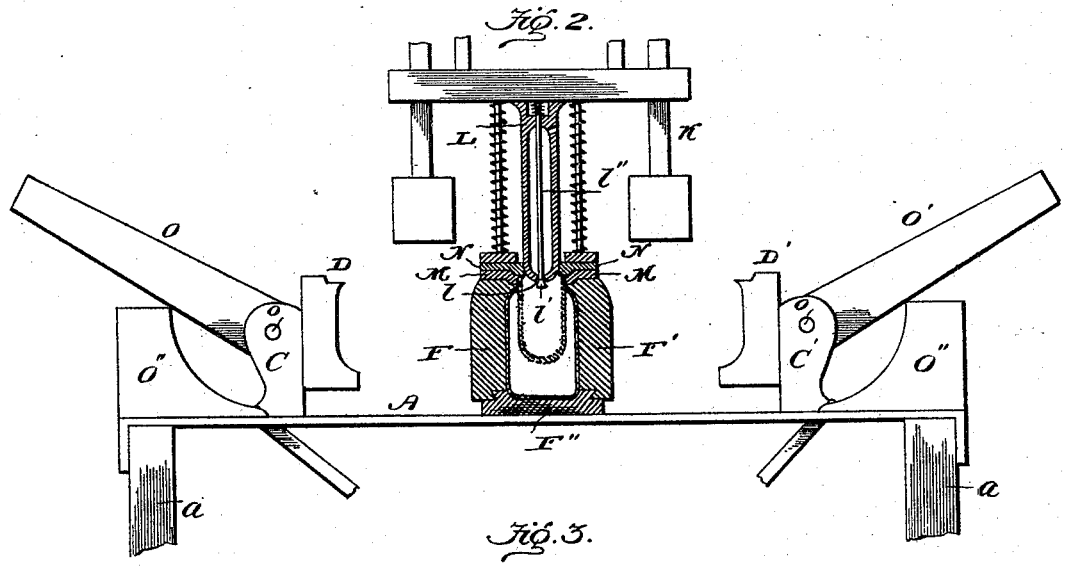
Figure 3:
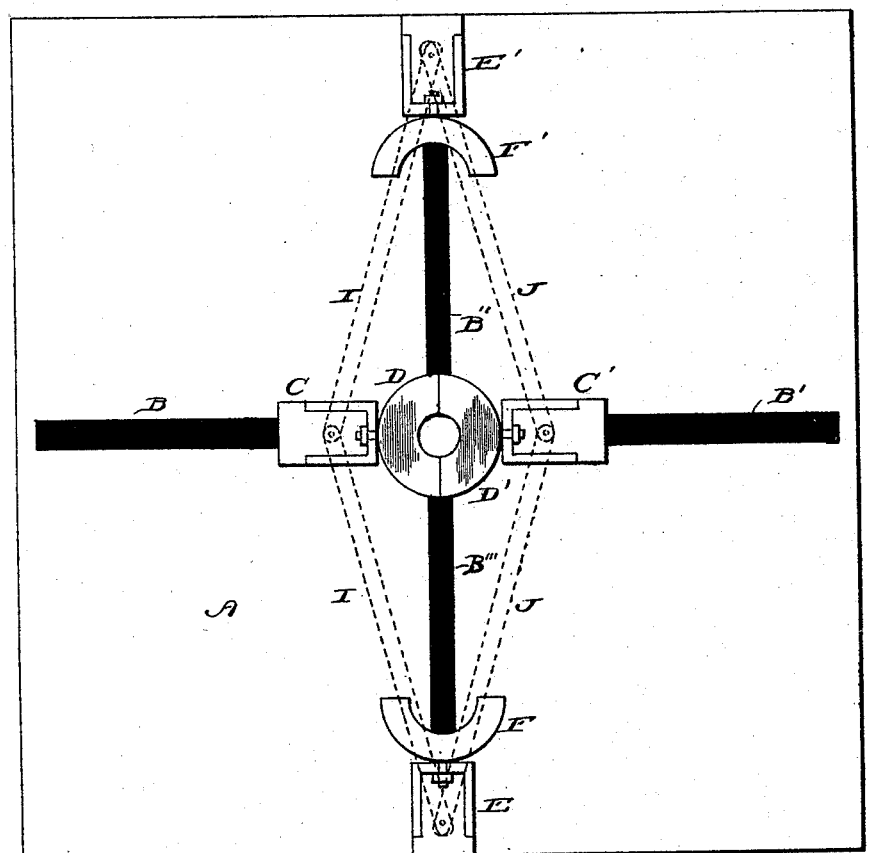

Figure 1 is a side elevation of our machine, showing the parison-mold closed. Fig. 2 is a view in side elevation with the parison-mold opened and with the finishing-mold closed around the embryonic vessel. Fig. 3 is a top plan view showing the parison-mold closed. Fig. 4 is a detail plan view showing the ring follower and the neck-mold thereon.

Like letters of reference denote corresponding parts in all the figures of the drawings, referring to which—

The letter A designates a table supported at a suitable height on legs or standards $a$. In this table we provide the slots B B' B'' B''', which lie at right angles with one another about the fixed bottom of the finishing-mold at the center of the table. In the slots B B' is fitted the riders C C', which carry the longitudinally-divided or two-part parison-mold D D', and in the slots B' B'' works another pair of riders E E', which in turn carry two of the three parts of the finishing-mold F F' F'', the interior of the finishing-mold F F' F'' being shaped in exact accordance to the vessel to be produced. This finishing-mold consists of a bottom F'' and a vertically-divided part forming the members F F', and of these three members the bottom F'' is fixed to and stationarily placed on the table A at the middle thereof, where the slots B B' B'' B''' converge, while the vertically-divided members F F' are attached to and are movable with the riders E E'.

The members D D' of the parison-mold are constructed or attached to their riders C C', so as to slide over the fixed bottom F'' of the finishing-mold, and the movable parts F F' of the finishing-mold are constructed to exactly register with each other and with the fixed bottom F'' when the vessel is to be blown in order that no imperfections may be produced in the finished product. The members D D' of the parison-mold and the riders C C', to which they are attached, are movable simultaneously in opposite directions by suitable mechanism.

One embodiment of the means for adjusting the riders C C' and the parison-mold, as shown in the drawings, contemplates the employment of the angular levers G G' and the foot-treadle or hand-lever G''. Each lever G G' is a three-armed lever, fulcrumed at $g$ to a horizontal bar g' under the table, and one end or arm h of each lever is fitted in a slot of the rider C or otherwise attached thereto, another arm of said lever is linked at h' to the treadle, while the third arm of said levers G G' is linked at h'' to an equalizer-bar H, which connects the two levers G G', another treadle H' being linked to said equalizer-bar for operating the latter, as may be required; but we do not confine ourselves to this particular method of adjusting the riders C C' in connection with the parison-mold, as it is merely incidental to the main features of our invention, and any convenient application of power may be substituted without substantially altering our mechanism.

The finishing-mold members F F' are movable in paths at right angles to the movement of the parison-mold members D D', and to quickly bring the finishing-mold members up to the glass vessel when the parison-mold D D' is withdrawn from the glass vessel we provide the toggle-joint connections I J between the riders C C' and D D' of the two molds, whereby the movement of the treadle H, which withdraws the parison-mold from the vessel, operates to move the finishing-mold members F F' up to and around the vessel and in proper relation to the fixed bottom member F'' of the finishing-mold. The links I connect the rider C with the riders E E' and the links J connect the riders C' with the riders E E', so that the parison-mold members D D' are caused to move in an opposite direction to each other and at right angles to the oppositely-movable members F F' of the finishing-mold, all the mold members being movable simultaneously on a single depression of the treadle. The two sets of riders C C' and E E' are fitted in the slots B B' B'' B''' to slide easily and truly therein, and the toggle connections I J are preferably arranged below the table, so as to be out of the way and not interfere with the operator in his work on the table. In connection with the two molds we employ a vertically-reciprocating press K, of any of the suitable forms, such as are used for pressing tumblers, jar-lids, &c. This press carries a hollow plunger L, which is provided with an exit-port l at its lower end, which port is normally closed by a plug or valve l' on the lower end of a slidable spring-pressed rod or stem l''. The spring that actuates this stem or rod exerts light tension on the valve, so that the latter is displaced slightly by the force of a current of steam or air, which is designed to be supplied to the hollow plunger by any suitable appliances for the purpose of blowing the glass vessel, or said valve may be displaced by vacuum following the withdrawal of the plunger. This press K is constructed so that the plunger, the neck-mold M M thereon, and the follower N can be held conveniently in either of two positions of rest—i. e., either raised away from the parison-mold D D' to permit glass to be run into the mouth of the mold, or rested on top of the mold D D' during the process of pressing and blowing the vessel, as in Fig. 2.

The means by which the press may be held in either of the described positions may be of the usual or any preferred construction, and as such means forms no part of the present invention and are well known to those skilled in the art to which the invention relates we have not deemed it necessary to illustrate or describe the adjusting means for the press.

The follower N is in the form of a ring suitably attached to the press K, and through this ring-like follower works the hollow plunger L. This follower-ring carries the neck-mold, which is in two parts, as at M M in Fig. 4, the parts of the divided neck-mold being pivoted, as at m, or otherwise conveniently adjusted to the follower-ring to permit the divided neck-mold to be opened or closed, as required.

With the divided parison-mold D D' we have combined means for locking the members fixedly in place when the members are closed. One embodiment of this locking means shown in the drawings contemplates the provision of the adjustable bars O O' and the stops or abutments O'' O''. The bars O O' are pivotally attached at o to the riders C C', which carry the parison-mold members D D', and the stops or abutments O'' O'' are fixed to the table A at such distances from the center thereof that when the parison-mold is closed the outer ends of the locking-bars O O' may be adjusted to rest or bear against the abutments, whereby the parison-mold is held securely and fixedly in position; but we do not confine ourselves to this special method of locking the parison-mold members, as it is merely incidental and may be accomplished by other well-known devices—as, for example, by a clamp attached to each mold member and dropping into a slot to lock them firmly in place.

With a machine constructed as described the operation is as follows: The press K is raised to its highest position, leaving the mouth of the parison-mold D D' open, the members D D' of which parison-mold are firmly clamped together by the locking-arms O O', as shown by Fig. 1. A quantity of hot glass is now introduced into the parison-mold and the press is lowered to rest upon the mold, while the plunger L is forced downward by suitable appliances into the hot glass. The follower and neck-mold descend with the press to bring the neck-mold into close juxtaposition to the open mouth of the parison-mold. As the hollow plunger is forced downward into the hot glass in the parison-mold a part of the viscous glass is forced up into the neck-mold sufficient to produce the neck of the vessel. As soon as this is accomplished the plunger L is partially withdrawn to the position shown by Fig. 2, the locking-arms O O' are liberated, the treadle is depressed to open the mold D D' and move the members thereof away from the neck-mold and embryonic vessel, and at the same time the finishing-mold members F F' are closed around the partially-formed vessel, which is yet in a viscous condition. After allowing a moment for the surface of the glass to recover from the chilling effects due to the withdrawal of the plunger and the parison-mold D D' and to the adjustment of the finishing-mold F F' a pressure of steam, air, or fluid is forced through the plunger and the glass is blown to the size and shape of the mold F F' F''. The apparatus now remains at rest for a length of time sufficient for the vessel to become cool and rigid, when the treadle is operated to cause the two molds to move to a position equidistant from the center of the table, the neck-mold M M is opened, and the press is raised, leaving free the finished vessel, which stands on the fixed bottom section F'''.

Having thus fully described our invention, what we claim as new, and desire to secure by Letters Patent, is—

1. In a machine for forming glass vessels, the combination with the supporting-table having a fixed bottom at the center of its top for the finishing-mold, slots lying at right angles with one another about said fixed bottom of the finishing-mold, riders C, C' carrying the two-part parison-mold D, D', riders E, E' carrying two of the three parts of the finishing-mold, the movable parts of said finishing-mold being attached to their riders to slide over the fixed bottom of the finishing-mold, substantially as specified.

2. In a machine for forming glass vessels, the combination of a two-part parison-mold, a sectional finishing-mold, and means substantially as described for operatively connecting the two-part parison-mold with the corresponding side sections of the finishing-mold, and means substantially as described for imparting motion to one of said molds, substantially as described.

3. In a machine for forming glass vessels, the combination of a three-part finishing-mold having a stationary bottom section and two movable side sections, arranged to register with each other and with the stationary bottom section, with a two-part parison-mold movable in a path at an angle to the movable sections of the finishing-mold, and connections, substantially as described, between the parison-mold and the corresponding sections of the finishing-mold to present the latter to the fixed bottom section when the parison-mold sections are withdrawn therefrom, as and for the purpose specified.

4. In a machine for forming glass vessels, the combination of a table provided with slots which lie at right angles to each other, two sets of riders slidably fitted in said slots, a two-part parison-mold attached to one set of riders, a three-part finishing-mold having its bottom section fixed to the table and its two movable sections carried by the other set of riders, the levers connected to one set of riders, and having means to actuate the same, and a toggle-joint connecting the two sets of riders, as and for the purposes described.

5. In a machine for forming glass vessels, the combination with a parison-mold and a finishing-mold, of a vertically-reciprocating press carrying a follower-ring, a divided neck-mold attached to said follower-ring, and a hollow plunger carried by the press and arranged to play through the follower-ring and the neck-mold, substantially as and for the purposes described.

6. In a machine for forming glass vessels, the combination with a parison-mold, and a finishing-mold, of a vertically-reciprocating press carrying a follower-ring, a neck-mold on said follower-ring, and a hollow plunger provided with a port at its lower end and with an automatic valve which tends to normally close said port, as and for the purposes described.

In testimony whereof we affix our signatures in presence of two witnesses.

ROBERT GOOD.
ROBERT GOOD, Jr.

Witnesses as to Robert Good:
IRVING ELTING,
MARTIN HEERMANCE.
Witnesses as to Robert Good, Jr.:
W. R. WILSON,
C. R. MILTON.